United States Patent [19]
Olson

[11] 4,013,873
[45] Mar. 22, 1977

[54] ELECTRIC HEATING FARROWING PAD WITH MEANS FOR OVERHEAD AND SIDE SHIELDING OF ELECTRIC CORD

[75] Inventor: Eldred Olson, Colfax, Ill.

[73] Assignee: Vi-Amino Feeds, Inc., Colfax, Ill.

[22] Filed: Nov. 6, 1975

[21] Appl. No.: 629,581

[52] U.S. Cl. .................. 219/541; 119/33; 174/68 C; 156/258; 219/528; 219/536; 285/423

[51] Int. Cl.[2] ........................................ H05B 3/08

[58] Field of Search ........... 219/217, 345, 527, 528, 219/529, 530, 536, 540, 541; 5/93, 9, 284; 119/1, 15, 20, 32, 33, 37; 174/136, 68 C; 285/260, 423, DIG. 16; 156/258

[56] References Cited
UNITED STATES PATENTS

| | | | |
|---|---|---|---|
| 2,280,779 | 4/1942 | Barragy | 119/33 |
| 2,453,849 | 11/1948 | Merriam | 285/423 X |
| 2,739,829 | 3/1956 | Pedlow et al. | 285/423 X |
| 2,785,910 | 3/1957 | Munger | 285/423 X |
| 2,866,066 | 12/1958 | Neely | 219/536 |
| 2,961,524 | 11/1960 | Newman | 219/536 |
| 3,041,441 | 6/1962 | Elbert et al. | 219/345 |
| 3,473,833 | 10/1969 | Bremer | 283/423 X |
| 3,476,915 | 11/1969 | Papsis | 219/523 |
| 3,873,391 | 3/1975 | Plauka et al. | 156/258 |

FOREIGN PATENTS OR APPLICATIONS

| | | | |
|---|---|---|---|
| 920,017 | 11/1954 | Germany | 174/68 C |
| 828,108 | 2/1960 | United Kingdom | 219/528 |

*Primary Examiner*—Volodymyr Y. Mayewsky
*Attorney, Agent, or Firm*—Dominik, Knechtel, Godula & Demeur

[57] ABSTRACT

An electrical heating farrowing pad of rigid plastic walls is adapted with shielding for either overhead supported outlets or side supported outlets along the floor of the farrowing pen. The shielding includes a tubular elbow fitting having one arm securely fixed between the rigid plastic walls of the farrowing pad, the elongated electric cord extending through the fitting. The electric cord is passed through an elongated tubular connector until the male plug extends from one end of said connector. The opposite end is aligned with the vertical arm of the elbow fitting and coupled to said arm to shield the cord for an overhead outlet. Alternatively, the horizontal arm of the elbow fitting is cut along a bias and a complementary bias cut is formed on the end of the tubular connector so that the shielding extends along the floor for connection to a side supported outlet.

2 Claims, 6 Drawing Figures

ELECTRIC HEATING FARROWING PAD WITH MEANS FOR OVERHEAD AND SIDE SHIELDING OF ELECTRIC CORD

This invention relates to electrically treated farrowing pads with improved shielding means for the electric cord.

The art has long concerned itself with means for heating farrowing pens to meet the body temperature requirements of the newborn piglets. Such heating means have included overhead infrared lights and heated fluid conduits embedded in or otherwise mounted along the floor of the pen. A recent contribution to this art is the provision of electrical resistance heating pads such as those disclosed in U.S. Pat. No. 3,041,441. Such pads as disclosed in this cited patent are made of rigid plastic layers, fiberglass impregnated with polyester. The electrical resistance elements are sandwiched between the rigid layers of plastic material. Such pads may be used with or without thermostatic controls.

A problem which must be considered and met is that of shielding the electric cord from such heating pad so the sow does not damage the cord or injure herself by chewing such cord. The art has recognized that some shielding is necessary but the shielding has usually been for floor placement of the electric cord. The art will recognize it to be a desirable goal to provide versatile shielding for the electric cord so such cord can be connected to overhead supported outlets or side supported outlets where the cord runs along the floor.

It is accordingly one object of the present invention to provide a structure and method by which farrowing pads, which are electrically heated can be alternatively adapted with efficient shielding for either overhead outlet connection or side outlet connection along the floor of the pen.

Another object is to provide an electrically heated rigid farrowing pad provided with an improved fitting which requires minimal handling and a few simple steps to attach such pad with proper shielding for either overhead outlet connection or side outlet connection along the floor of the farrowing pen. It is a feature of this object that the fitting can be used in its original condition for overhead shielding or be quickly adapted by simple cutting for shielding along the floor of the pen. Such object is further served by the provision of a simple coupling of the shielding means to the farrowing pad fitting.

Such objects are now attained along with still other objects which will occur to practitioners from time to time by considering the invention of the following disclosure which includes drawings, wherein.

Figure 1:
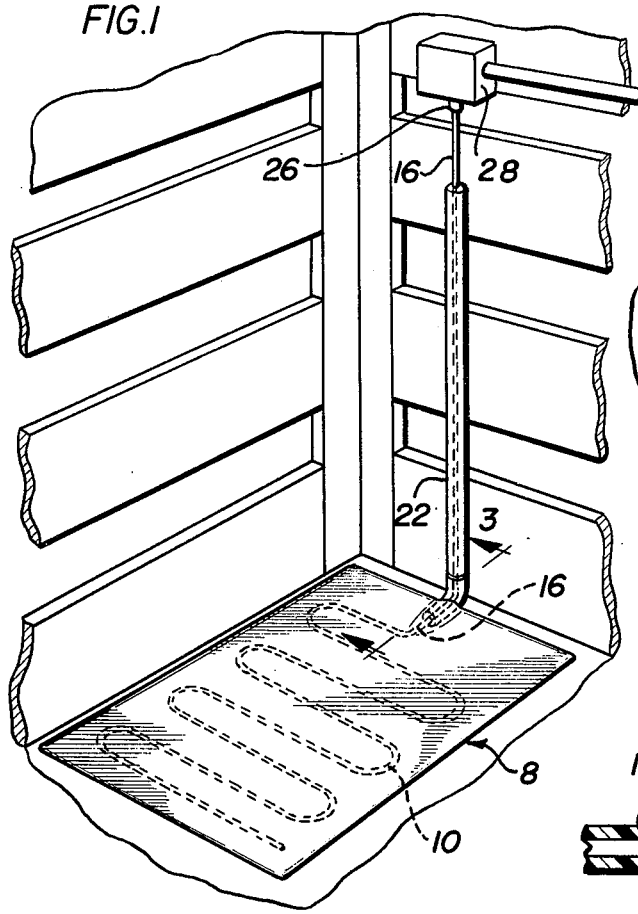
FIG. 1 is a perspective view showing a farrowing pad adapted with shielding for overhead outlet connection.

The rigid farrowing pad is shown generally as 8, and such pad is of the rigid plastic type having an electrical resistance heating element 10 placed between an upper substantially rigid plastic layer 12 and a lower substantially rigid plastic layer 14. Electrical heating farrowing pads of this general construction are shown in U.S. Pat. No. 3,041,441, and the plastic layers may be polyester which impregnate glass fibers.

An elongated electric cord 16 is connected to the resistance heating element 10, and such cord passes through an elbow shield or tubular fitting 18, which is preferably formed of a substantially rigid plastic such as high density polyethylene. The tubular elbow has a horizontal arm 19 which is securely seated and fixed between layers 12, 14 of the substantially rigid farrowing pad. In one form, bottom layer 14 may be cast into a mold, the tubular elbow 18 may then be positioned on said partly cured layer 14 of plastic, and the top layer 12 may then be cast over the positioned tubular elbow 18. Curing of both layers will securely fix the tubular elbow fitting between the layers. The elbow also has an upwardly extending arm 20 which is in vertical relationship to the plane or surface of the farrowing pad.

Figure 2:
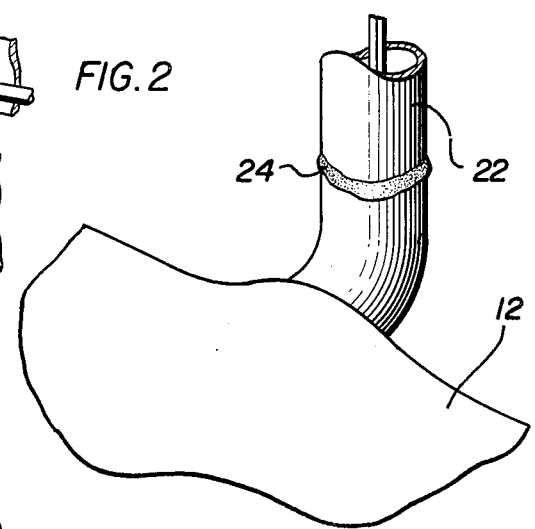
FIG. 2 is a portional and perspective view, on an enlarged scale, of the elbow fitting with the coupled tubular connector for overhead outlet connections.
Figure 3:
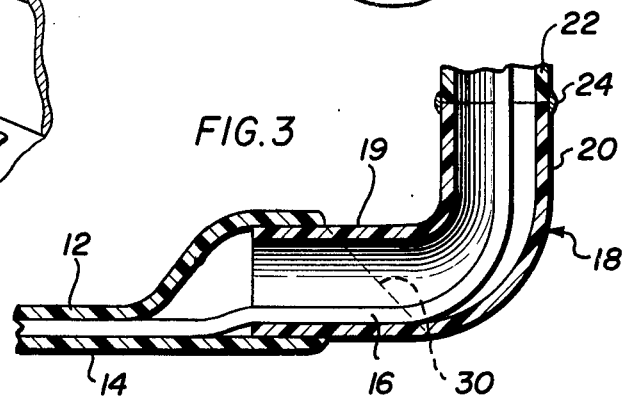
FIG. 3 is a sectional view, on an enlarged scale, taken along line 3—3 in the view of FIG. 1.

The views of FIGS. 1-3 illustrate an overhead tubular connector or shield 22. It is seen that the elbow fitting 18 and the tubular connector 22 are cylindrical in configuration, and the continuous walls of such tubular structures have similar configurations and dimensions to allow end to end alignment, as shown. The junction at the end to end alignment of the tubular connector and elbow 30 is coupled in various ways, and the illustrated means for such coupling is shown as a continuous bonding fillet 24. Such bonding material may be applied in various ways to substantially cover the junction line and securely bond the vertical arm 20 to the tubular connector 22. Other coupling means may be selected, such as providing a tubular connector of slightly reduced diameter relative to the diameter of the elbow fitting 12 so as to attain a telescopic engagement. Still other coupling means will occur to practitioners.

The passageway of the aligned and coupled fitting and tubular connector is such as to allow free passage and exit of the electric cord 16 as well as the terminating cord plug 26. The plug 26 in the views of FIG. 1-3 is adapted to be connected to an overhead supported outlet 28. Such outlet may be suspended or mounted to an overhead pen frame structure indicated only schematically.

Figure 4:
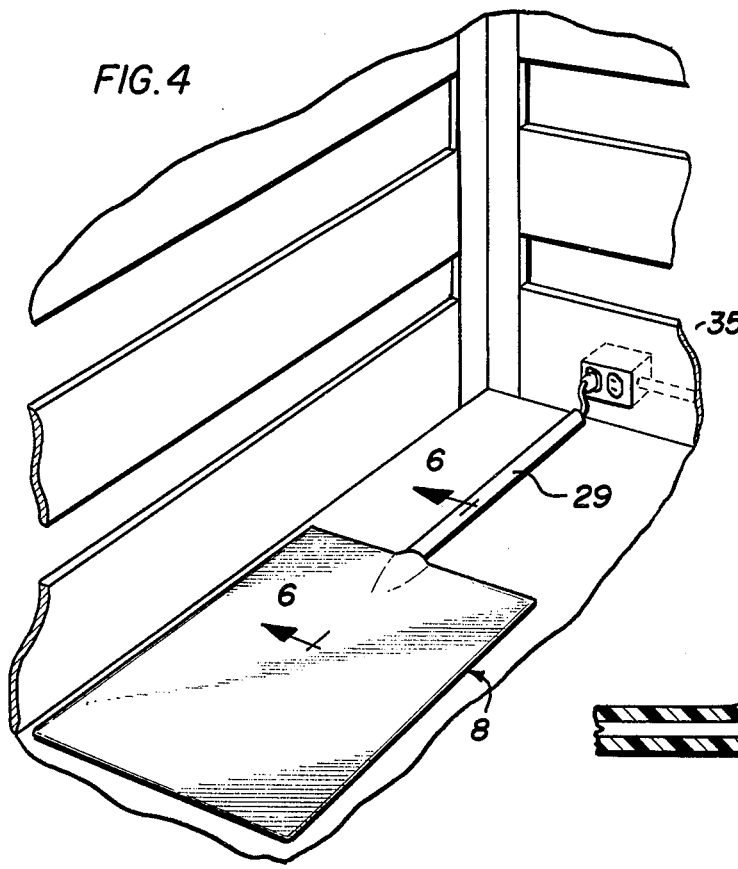
FIG. 4 is a perspective view similar to that of FIG. 1, but showing the alternative shielding for side supported outlet connection along the floor of the farrowing pen.
Figure 5:
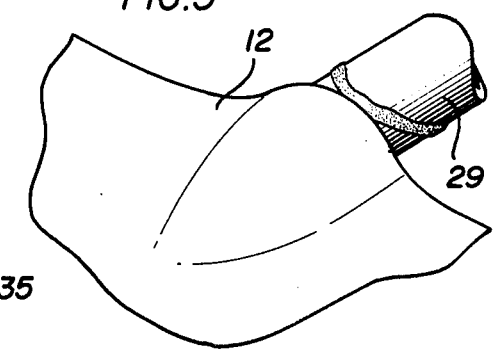
FIG. 5 is a view similar to that of FIG. 2 showing the tubular connector coupled to a cut portion of the elbow fitting.
Figure 6:
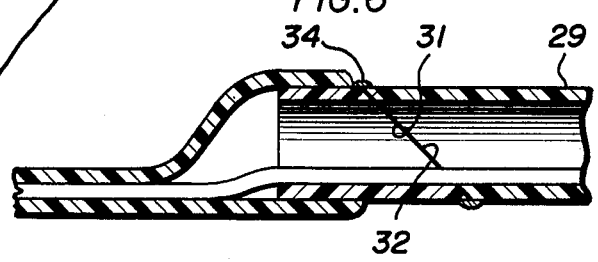
FIG. 6 is a sectional view, on an enlarged scale, taken along line 6—6 of FIG. 4.

The tubular connector shielding may be coupled to the elbow fitting in an alternative way for shielding the electric cord along the pen floor. The tubular connector shield 29 extends along the floor as shown in the view of FIG. 4, and such a tubular connector 29 is coupled to the elbow fitting 18 which must first be modified. The modification requires cutting the fitting in the horizontal arm area along a bias cut indicia line 30. The resulting bias cut 31 is matched with a complementary bias cut 32 at the end of the tubular connector. Such tubular connector is also preferably provided with a bias cut guide or indicia line 33. The bias cuts of the horizontal arm 19 and the tubular connector 29 are aligned end to end, and the junction of said aligned bias cuts are coupled by means such as a continuous bonding fillet 34. The plug of the electric cord extending from the tubular connector can then engage outlet 35 which is side supported in the farrowing pen, generally adjacent the floor of the pen.

A method is now provided which allows the user to selectively adapt shielding for the electric cord to either an overhead supported outlet or a side supported outlet adjacent the floor of the pen. Generally such outlet is outside the wall of the pen to prevent access to the outlet by the sow or the piglets. The method of shielding is practiced simply and reliably by first selecting an elongated tubular connector of a desired length, then passing the electric cord and plug through one end, and pulling said plug out of the opposite end. For overhead connection, the end to end alignment of the tubular connector and the elbow fitting forms a junction line which lies in a plane that is normal to the longitudinal axis of the tubular connector and the vertical arm of the elbow fitting. The tubular connector and the elbow fitting are then coupled, as by bonding the junction line, and the plug is connected to the overhead supported outlet.

Alternatively, floor shielding is attained by cutting the horizontal arm of the elbow fitting along the bias guide line and then placing said bias cut in end to end alignment with a complementary bias cut in the end of the tubular connector. Such tubular connectors can be provided with a precut biased end, or the bias cut can be made by following a bias guide line. The junction of the biased ends lies in a plane which is in angular relationship to the longitudinal axis of the horizontal arm 90. The aligned bias cut ends are then coupled, as by applying bonding material to substantially cover the continuous junction between the ends. It is preferred that both the tubular connector and the elbow fitting be formed of economically substantially rigid plastic material which effectively shields the electric cord against biting action and retains its structural form under the weight of the sow. Such plastics are easily cut to provide the alternative floor shielding, and likewise provide an insulating envelope for the electric cord.

The claims of the invention are now presented and the terms of such claims may be further understood by reference to the language of the preceding specification and the views of the drawings.

What is claimed is:

1. An electric heating farrowing pad having upper and lower rigid plastic walls with an electrical resistance heating element between said plastic walls, said heating element connected to an elongated electric cord with a terminating male plug, and means to shield said electric cord for connection to an electrical outlet, including a rigid cylindrical elbow fitting through which said electric cord may pass, a horizontal arm of said elbow fitting fixed between said upper and lower plastic walls, a vertical arm joined to said horizontal arm, and an elongated rigid cylindrical connector having a continuous sidewall of easily cut material and having a length sufficient to enclose substantially the entire length of said electric cord up to about the male plug, the sidewalls of the elbow fitting and tubular connector having substantially uniform configurations and dimensions to allow end to end coupling by selectively aligning and coupling the tubular connector end with said elbow fitting, whereby the cord maybe alternatively shielded for overhead connection by coupling the connector to said vertical arm or be shielded for sidewall connection by cutting the elbow fitting and coupling the connector to the horizontal arm.

2. An electric heating farrowing pad with means to selectively shield the electric cord of the pad which includes the features of claim 1 above and which further includes a bias cut indicia line on the horizontal arm of the elbow fitting and a similar indicia line on the tubular connector so the bias cut ends can be matched in end to end alignment.

* * * * *